Feb. 27, 1968 R. W. BENNETT ET AL 3,371,336
HERMETICALLY SEALED CODED ROTARY SWITCH
Filed July 2, 1964 3 Sheets-Sheet 1
FIG. 1A
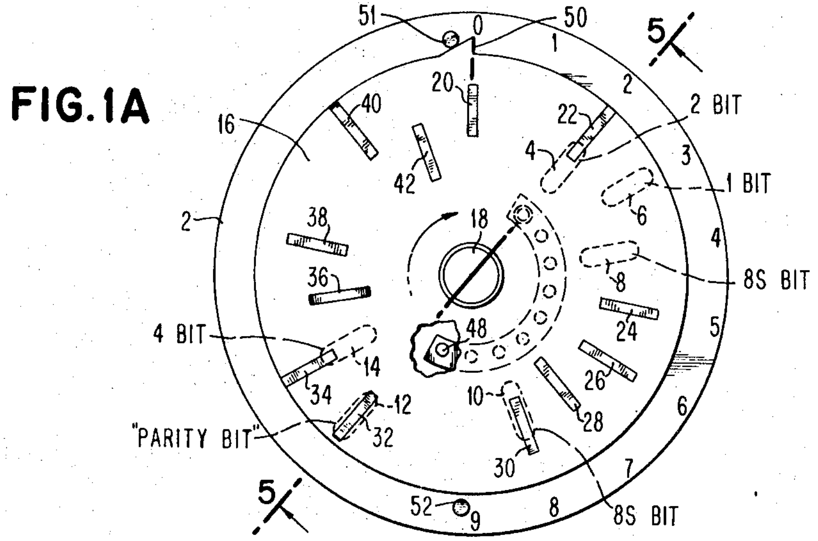
FIG. 1B, FIG. 1C
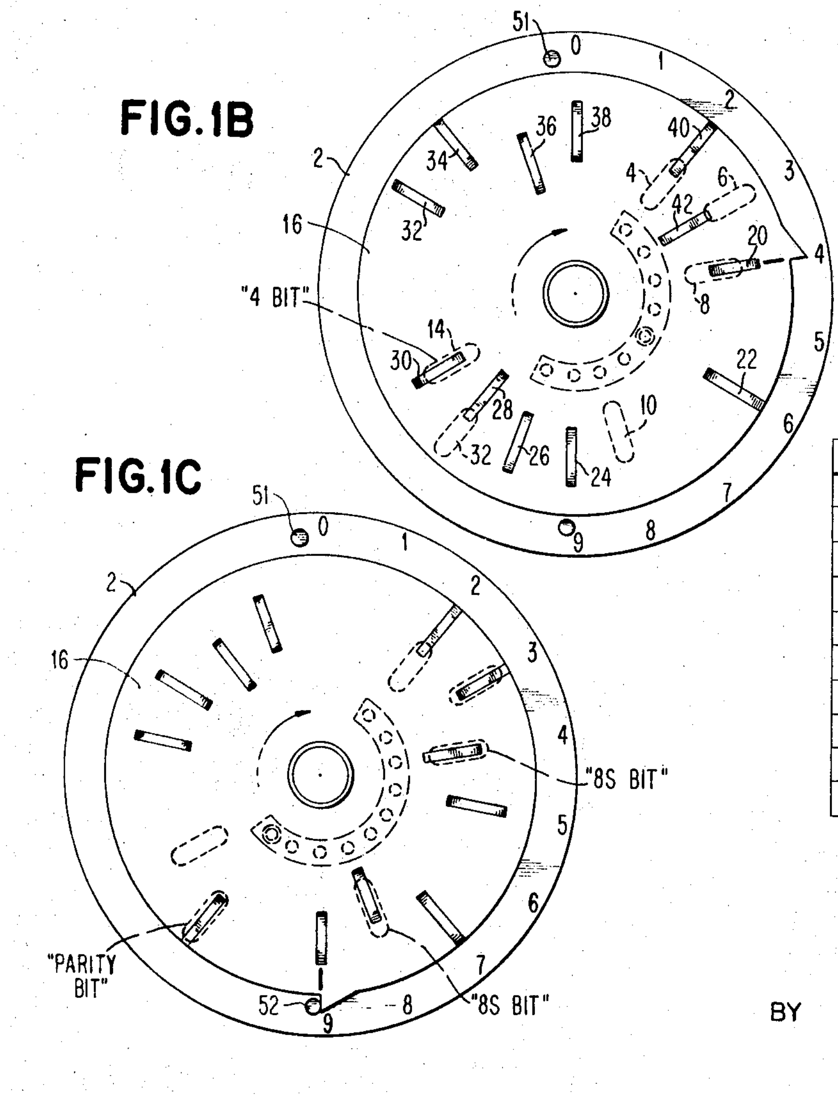
FIG. 2
| POS. | 1 | 2 | 4 | 8 | P |
|---|---|---|---|---|---|
| 0 | 0 | 0 | 0 | 0 | 1 |
| 1 | 1 | 0 | 0 | 0 | 0 |
| 2 | 0 | 1 | 0 | 0 | 0 |
| 3 | 1 | 1 | 0 | 0 | 1 |
| 4 | 0 | 0 | 1 | 0 | 0 |
| 5 | 1 | 0 | 1 | 0 | 1 |
| 6 | 0 | 1 | 1 | 0 | 1 |
| 7 | 1 | 1 | 1 | 0 | 0 |
| 8 | 0 | 0 | 0 | 1 | 0 |
| 9 | 1 | 0 | 0 | 1 | 1 |
INVENTORS
RICHARD W. BENNETT
MORRIS KRAKINOWSKI
GEORGE R. STILWELL, JR.
BY George Baron
ATTORNEY

| POS | 1 | 2 | 4 | 8 | P |
|---|---|---|---|---|---|
| 0 | 0 | 1 | 0 | 1 | 1 |
| 1 | 1 | 0 | 0 | 0 | 0 |
| 2 | 0 | 1 | 0 | 0 | 0 |
| 3 | 1 | 1 | 0 | 0 | 1 |
| 4 | 0 | 0 | 1 | 0 | 0 |
| 5 | 1 | 0 | 1 | 0 | 1 |
| 6 | 0 | 1 | 1 | 0 | 1 |
| 7 | 1 | 1 | 1 | 0 | 0 |
| 8 | 0 | 0 | 0 | 1 | 0 |
| 9 | 1 | 0 | 0 | 1 | 1 |

United States Patent Office 3,371,336

Patented Feb. 27, 1968

3,371,336
HERMETICALLY SEALED CODED ROTARY SWITCH

Richard W. Bennett, Yorktown Heights, Morris Krakinowski, Ossining, and George R. Stilwell, Jr., West Nyack, N.Y., assignors to International Business Machines Corporation, New York, N.Y., a corporation of New York Filed July 2, 1964, Ser. No. 379,792
2 Claims. (Cl. 340—347)

ABSTRACT OF THE DISCLOSURE

A hermetically sealed coded rotary switch is provided by employing a single magnet on a rotary member to service a plurality of reed switches on a stator element. A plurality of magnets are in different tracks and the switches are in different tracks, both magnets and switches being radially offset to reduce the number of switches and magnets needed to generate a binary code. The binary code is generated in an ordered manner for each successive number of the code generated.

This invention relates to rotary switches and more particularly to a rotary switch designed to produce a binary coded decimal output.

In the use of large computers it is necessary to introduce input signals representative of numbers 0 to 9. Such input information generally appears in the form of binary signals wherein 1 is represented by the binary notation $2^0$, 2 is represented by $2^1$, 4 is represented by $2^2$, and 8 is represented by $2^3$. Each power of 2 is called an order and $2^0$ would represent a low order binary value and $2^2$ would represent a higher ordered binary value. For purposes of monitoring the output information of such a switch, a "parity" bit is also generated. For example, if a binary number is represented by the expression 1010 (the number 5), a parity bit would be generated so that the total number of 1's appearing in the output would be odd. For purposes of illustrating the invention, the low order bits begin at the left of the binary number and the higher orders comprise the right portion.

Such binary coded decimal codes are quite conventional in computer equipment and their operation and function are well known in the art. An exemplary type rotary switch would consist of a fixed disc containing contact or reed switches and a rotary disc containing magnetic elements. The reed switches are located in such a fashion that when the magnet-containing rotary disc passes within a prescribed area of an associated reed contact, the latter closes. Various combinations of closed switches take place as a function of the angular rotation of the magnet-bearing disc. Such combinations of closed contacts are designed to produce, in an ordered fashion, the outputs 0 to 9.

In previous switches employed to produce the binary coded decimal (BCD) output, it has been customary to employ a single reed switch and a single magnet for each binary order that is to be produced as an output by the switch. Consequently, as the orders of the binary code increased, the number of magnets and reed switches increased accordingly.

It is highly desirable when employing switches in computer devices that the former be as compact and as economically produced as possible. It is also desirable to provide a binary coded decimal output having a large number of orders without increasing the number of output switches or magnetic elements in the switch. It is also desirable to obtain such compactness without having such rotary switch produce spurious outputs.

The aforementioned compactness has been obtained by employing a rotary switch whereby one or more tracks of magnets is used on the rotary portion of the switch and each track of magnets serves more than one reed switch. The reed switches contained within the same track are offset so that sectors which pass under each reed switch are the same size. However, the actual sector passing under each reed switch occupies a different space on the track of magnets and therefore generates different output signals. By the novel configuration to be described hereinafter, a single magnet on a rotary member serves a plurality of reed switches in such a manner that not only is there a saving in the number of elements needed to obtain a binary coded decimal output, but the additional feature of an inhibiting mechanism is employed to prevent the generation of spurious outputs.

It is an object of this invention to provide a novel switch capable of generating a binary decimal coded output.

It is a further object to employ a contactless rotary switch capable of generating a binary decimal coded output.

Yet another object is to provide a rotary switch wherein a given magnet serves a plurality of magnetic switches in a single track.

Still another object is to employ a plurality of tracks of switchable magnetic elements on a single rotary switch yet obtain an ordered binary decimal coded output.

The foregoing and other objects, features and advantages of the invention will be apparent from the following more particular description of preferred embodiments of the invention as illustrated in the accompanying drawings.

In the drawings:

FIGURE 1A is a representation of the binary coded decimal switch in its initial or starting position; FIGURE 1B is an intermediate position and FIGURE 1C is the final position of travel of said rotary switch.

FIGURE 2 is the code generated by the invention for different ordered positions of the switch shown in FIGURES 1A–1C, said code showing low order binary values of the number starting at the left of the number.

Figures 3A, 3B, 4:
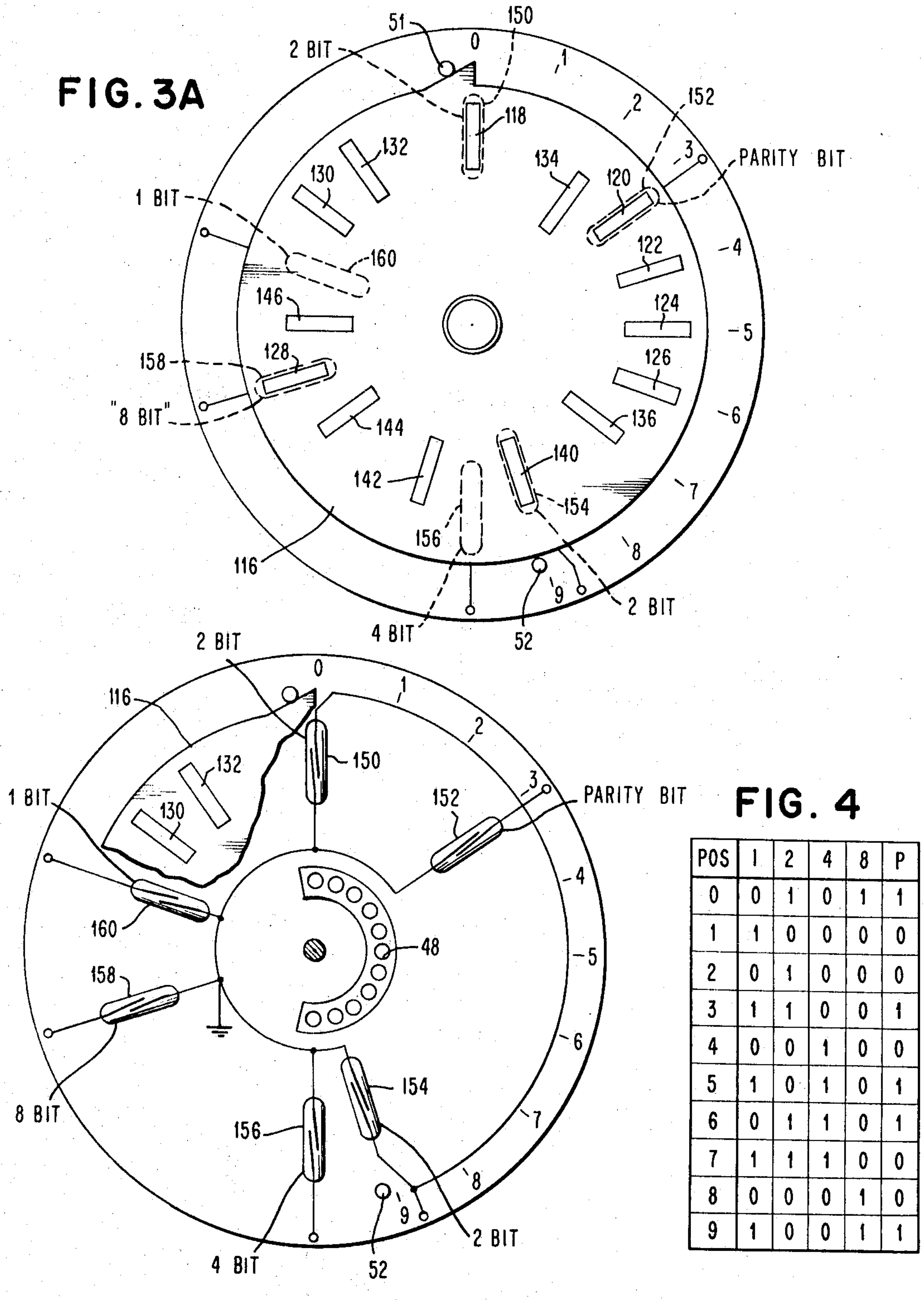
FIGURES 3A and 3B are modifications of the switch of FIGURES 1A–1C for generating the code displayed in FIGURE 4.

The switch of FIGURE 1A comprises a stator 2 made of any suitable electrical insulating material in which are imbedded switches 4, 6, 8, 10, 12 and 14. For ease of operation and long life, switches are used that are of the type disclosed in "Development of Reed Switches and Relays," by O. M. Hovgaard et al., "Bell System Technical Journal," vol. 34, page 309 et seq. Such reed switches consist of two magnetic elements enclosed within a glass envelope, the magnetic elements making contact in response to a magnetic field within range of the elements. Such reeds have received wide use because the glass seal prevents arcing in an explosive atmosphere, is responsive to a small magnetic field, and leads to an extremely long life contact. The rotor 16 of the switch is made of any suitable insulating material and is affixed to shaft 18 so that magnets 20, 22 . . . 42, which are secured to said rotor 16, will actuate various reed switches as said rotor 16 moves in a clockwise fashion. In the example of FIGURE 1A, reed switches 6 and 12 lie in one track and switches 4, 8, 10 and 14 lie in a second track. Magnets 22, 32, 34 and 40 lie in the same track on rotor 16 and affect only switches 6 and 12. Magnets 20, 24, 26, 30 and 38 lie in a second track and affect all the switches, but at different times. It is noted that two tracks of magnets do not necessarily affect switches lying in only one track. They are located so as to actuate switches lying in different tracks. In effect, a single track of magnets will affect switches that are offset on either side from said single track of magnets.

To generalize, all the switches of FIGURE 1A can be deemed to lie in two basic tracks on the stator 2. The magnets normally would also lie on two basic tracks on the rotor 16 to coincide with the switch tracks. However, to minimize the number of magnets and/or switches, individual magnets are offset from their basic tracks so as to periodically actuate switches from either of the basic switch tracks.

Figure 5:
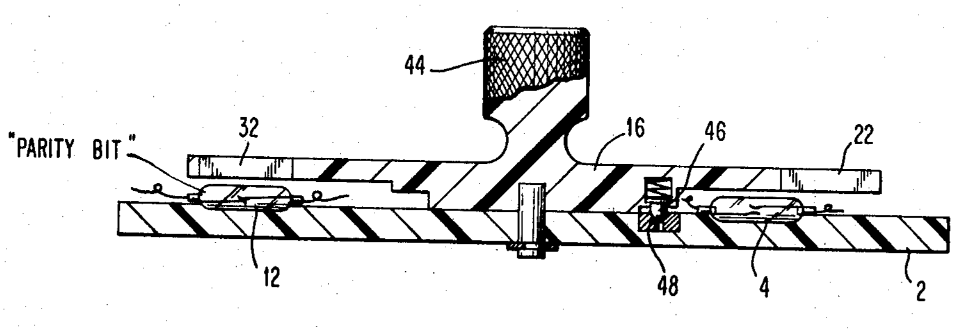
FIGURE 5 is a cross-section of the switch taken along the axis 5—5 of FIGURE 1A.

As is better seen in FIGURE 5, a knob 44 is rotated to urge rotor 16 in a clockwise direction, whereby every 20° of arc, a spring-urged ball 46 is set into groove 48 to positionally lock the rotor 16 with respect to stator 2. A lip 50 (see FIG. 1A) protrudes from the periphery of rotor 16 so that pin 52 prevents said rotor 16 from rotating clockwise more than 180°. Another stop 51 is located on the stator 2 in the vicinity of the start position so that the rotor 16 is restrained from rotating in a counterclockwise position from its starting position. This stop 51 avoids obtaining invalid outputs should the rotor 16 be inadvertently rotated in a counterclockwise direction In the embodiment of FIGURE 1A, switches 8 and 10, whose outputs represent the decimal 8, are connected in a series circuit, not shown, so that both switches 8 and 10 must be actuated by their associated magnets during a locked position of rotor 16 in order for the $2^3$ bit to be transmitted as part of a coded output.

The code shown in FIGURE 2 employs odd parity and has ten distinct positions. The code is shown inverted from conventional codes in that the low orders of a binary number start at the left of such number; but such illustration does not detract from the teaching of the invention. Merely by labelling the first column of FIGURE 2 as $2^3$, the second column as $2^2$, the third column as $2^1$, etc., the more conventional illustration of a binary number is obtained. In the starting or "0" position of the rotor 16, only reed switches 12 and 10 are actuated, such actuation taking place because of the influence of magnets 32 and 30. Since switch 12 represents the "parity" or "P" output, and since switch 8 of the 8–10 series pair is open, and no other reed switches are actuated, then position 0 will yield the output 00001. For the 1 position, assuming the rotor moves clockwise as indicated by the arrow, switch 6 is closed, 10 remains closed, and 12 opens. In the 4 position of the rotor, as seen in FIGURE 1B, only switches 8 and 14 are actuated by their associated reeds. However, since switch 8 is in a series circuit with switch 10, the latter being unactivated, there is no output from switch 8. Thus only switch 14, whose output represents the value $2^2$, produces an output. When the rotor 16 reaches its number 9 position, as seen in FIGURE 1C, further clockwise travel is arrested by pin 52, and it is seen that the switches producing outputs correspond to the $2^0$ bit, the $2^3$ bit and the parity bit. It is noticed that in the number 9 position, both switches 8 and 10 are simultaneously actuated so that the $2^3$ output is produced.

The arrangement of magnets and reed switches in different tracks has been employed to reduce the overall use of reed switches and magnets in obtaining a binary coded decimal output wherein each successive position of the rotor yields the next successive decimal number from 0 to 9. It is seen that magnets forming a track, such as magnets 28, 36 and 42, are placed in concentric circles so that they actuate a particular set of switches, but are axially offset in relation to all other switches. In practice, the axial offset is equal approximately to half the length of a magnet.

In order to benefit from the teachings of the invention, the following definitions are relied upon. The rotary switch should have a total number of index positions $p$ and a smaller number of index positions $n$ through which the switch is permitted to turn. The number of binary bits to be produced as outputs by the rotary switch is $b$. In the example of FIGURE 1A, $p=18$ in that there is a possible index position every twenty degrees of arc, $n=10$ in that pins 51 and 52 permit only ten of the eighteen possible switch positions, and $b=5$, the number of binary bits needed to produce the code shown in FIGURE 2. The number of possible positions $p$ is chosen so that there are a sufficient number of extra positions $p-n$ (in this case there are eight such extra positions) to produce the exact "wrap-around" whereby the magnets which produce a certain desired code fulfill the remaining code combinations in the "wrapped-around" positions. For example, magnets 36 and 42 complete the code output that is not produced by the travel of magnet 28 in its permissible travel from position 0 to position 9. The value of $p$ must be chosen to be less than $n \times b$ so that such "wrap-around" occurs. In the case chosen to illustrate the invention, $p=18$, $n=10$ and $b=5$ so that the relationship $p<n \times b$ is maintained. Thus as used in the present description of the invention, "wrap-around" occurs or exists in a rotary switch when a magnet services one reed switch and, during its clockwise travel, services other reed switches so as to permit a single track of magnets to produce two or more distinct output signals corresponding to different orders of the binary code of FIGURE 2. It is also seen that the rotary switch may contain more than one track of magnets, and each track of magnets may include more than one reed switch actuable by said magnets. To obtain more compactness in the structure of the rotary switch, both magnets 20, 22, etc., and the reed switches 4, 6, etc., are placed at different radial distances. All sectors (20° of arc) of the rotary member 16 which pass over a given reed switch 4, 6, etc., are of the same size, but the actual sector passing over a given reed switch at any time affects a different track of switches, because the latter are radially offset, permitting output signals, corresponding to different orders of the binary code, to be generated.

FIGURE 3A illustrates a configuration of magnets and switches employed to generate the binary code shown in FIGURE 4. In this embodiment, the decimal number "0" is represented by the binary notation 01011 instead of 00001 as shown in FIGURE 2. For certain conditions, it is desirable to represent the zero position by the decimal value of "10" rather than "0" and, where this is the case, a code generator of the type shown in FIGURE 3A is employed.

In FIGURE 3A, there are 20 distinct index positions so that each sector of the rotor 116 is 18° of arc. Magnets 118, 120, 122 . . . 132 lie in one track and magnets 134, 136, 140 . . . 146 lie in a second track on rotor 116. All six reed switches 150, 152 . . . 160 also lie in the two tracks, switches 150, 152, 156 and 158 lie in one track and switches 154 and 160 lie in a second track that is radially shorter than the first track of switches. It is seen that the "0" position of rotor 116 generates the code 01011 and all other positions of the rotor generate the same code as shown in FIGURE 2.

It should be noted that switches 150 and 154 are connected as an OR circuit and a $2^2$ output is generated when either of the switches 150 and 154 is actuated. The last position of the rotor 116 is determined by the location of pin 52, the latter being placed at 162° from "0" position instead of at 180° from "0" position as shown in FIGURE 1A. Thus, for the embodiment of FIGURE 3A, $p=20$, $n=10$ and $b=5$ so that the relationship $p<n \times b$ is maintained. To generate the code of FIGURE 4, the embodiment of FIGURE 3A relies upon 14 magnets and 6 switches.

FIGURE 3B is a showing of the embodiment of FIGURE 3A with a portion of the rotor 116 cut away so that the circuitry for the reed switches can be more clearly illustrated. As is seen in such figure, switches 150 and 154 are ORed to produce the $2^1$ order output of the binary code of FIGURE 4.

Figure 6:
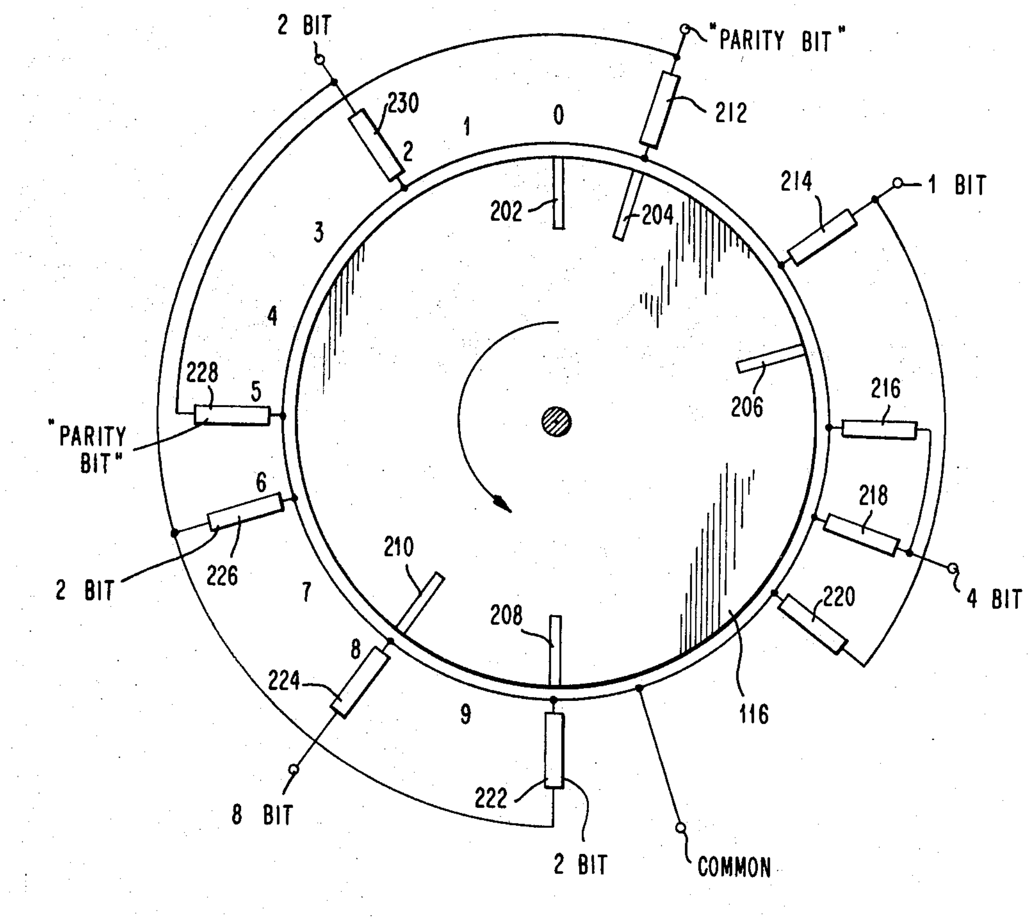
FIGURE 6 is a second modification of the switch of FIGURE 1 for generating the code shown in FIGURE 4.

FIGURE 6 illustrates yet another configuration of magnets and switches for obtaining the BCD code set out in FIGURE 4. The code is generated using only one track of five magnets 202, 204, 206, 208 and 210 and only one track of ten switches 212, 214 . . . 230, both tracks being at the same radial distance from the center of the rotary switch. Each sector of the rotor 116 is 20° and certain of the reed switches are ORed to produce the binary outputs of the code shown in FIGURE 4. For example, switch 212 is ORed with switch 228 to produce the parity bit output, switch 214 is ORed with switch 220 to produce the $2^0$ bit output, three switches 222, 226 and 230 are ORed to produce the $2^1$ bit output, switches 216 and 218 are ORed for the $2^2$ bit output and only one switch 224 is relied upon to produce the $2^3$ bit output. It is understood that the structure of the device of FIGURE 6 is substantially the same as that shown in FIGURES 1A, 1B, 1C, 3A, 3B and 5; that is the switches 212, 214 . . . 230 would lie in a track on a stator below rotor 116 and such track will coincide with the track of magnets 202, 204 . . . 210 that lie in rotor 116. Means for limiting the travel of rotor 116 are omitted from FIGURE 6 in that they are not necessary to describe the invention embodied therein.

In the embodiment of FIGURE 6, five magnets and ten switches produce the code of FIGURE 4 instead of the six switches and fourteen magnets employed in FIGURE 3A, but four OR circuits are used to attain the advantage of fewer tracks. The value of each sector is 18° and the number of possible index positions $p$ is 20, the number of actual index positions $n$ through which the switch is permitted to turn is 10, and the binary bits $b$ produced by the rotary switch is 5, so that there are a sufficient number of extra positions $p-n$ to produce the needed "wrap-around," namely, those magnets which are needed to produce a desired code fulfill the remaining code combinations in the wrapped-around condition.

The present invention provides a rotary switch that is rugged, compact, produces an ordered output of a BCD code, relies upon only one stator and one rotor to produce such code. Additionally, such switch is simpler in operation and construction than many rotary switches now available for generating a BCD code.

While the invention has been particularly shown and described with reference to preferred embodiments thereof, it will be understood by those skilled in the art that various changes in form and details may be made therein without departing from the spirit and scope of the invention.

What is claimed is:

1. A rotary switch comprising a concentrically disposed rotor and stator, said stator having two tracks of bistable elements affixed at different given radial distances from the axis of said stator, three tracks of switch-actuating elements disposed at different radial distances on said rotor, output means connected to each of such switch elements for generating a binary code in accordance with the binary states of said switch elements, means for rotating said rotor so as to sequentially cause said switch-actuating elements to produce non-contact actuation of various combinations of bistable elements, and means for combining said output means so that a binary coded decimal output is produced in ascending order as said rotor is sequentially rotated.

2. A rotary switch comprising a concentrically disposed rotor and stator, said stator having a plurality of reed switches capable of non-contact actuation by magnetic fields, each of said reed switches lying in two concentric tracks, a plurality of magnetic elements lying in three concentric tracks in said rotor, means for rotating said rotor to discrete angular positions with respect to said stator so that said magnets periodically actuate switches in either or both of said two concentric tracks, and means for obtaining outputs from said switches such that each successive discrete angular position of said rotor produces the next successive decimal number of a binary code.

References Cited

UNITED STATES PATENTS

| | | | |
|---|---|---|---|
| 2,758,788 | 8/1956 | Yaeger | 340—347 |
| 2,922,994 | 1/1960 | Kennedy | 340—347 |
| 3,024,986 | 3/1962 | Strianese | 340—347 |
| 3,105,232 | 9/1963 | Boots | 340—347 |
| 3,221,325 | 11/1965 | Hartog et al. | 340—347 |
| 3,228,021 | 1/1966 | Lehmer | 340—347 |
| 3,230,523 | 1/1966 | Farrand | 340—347 |

MAYNARD R. WILBUR, *Primary Examiner.*

W. J. KOPACZ, *Assistant Examiner.*